US006281897B1

(12) United States Patent
Berry et al.

(10) Patent No.: US 6,281,897 B1
(45) Date of Patent: Aug. 28, 2001

(54) METHOD AND APPARATUS FOR MOVING AND RETRIEVING OBJECTS IN A GRAPHICAL USER ENVIRONMENT

(75) Inventors: Richard Edmond Berry; Scott Harlan Isensee, both of Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,629

(22) Filed: Jun. 29, 1998

(51) Int. Cl.[7] ........................................................ G06F 3/00
(52) U.S. Cl. ............................................. 345/341; 345/346
(58) Field of Search ..................................... 711/118, 120, 711/128, 119; 345/341, 342, 343, 344, 345, 346, 347, 348, 340, 349, 355, 339

(56) References Cited

U.S. PATENT DOCUMENTS

| | | | |
|---|---|---|---|
| 5,499,334 | * 3/1996 | Staab ..................................... | 345/343 |
| 5,835,090 | * 11/1998 | Clark et al. ........................... | 345/339 |
| 5,974,506 | * 10/1999 | Sicola et al. .......................... | 711/120 |
| 5,978,888 | * 11/1999 | Arimilli et al. ....................... | 711/128 |
| 6,018,332 | * 1/2000 | Nason et al. .......................... | 345/127 |
| 6,023,746 | * 2/2000 | Arimilli et al. ....................... | 711/118 |

* cited by examiner

Primary Examiner—Steven Sax
(74) Attorney, Agent, or Firm—Andrea Pair Bryant; Leslie A. Van Leeuwen; Richard A. Henkler

(57) ABSTRACT

A method and apparatus are disclosed for moving one or more objects from and returning them to a user visible portion of a work plane, which includes but is larger than the visible portion, by interpreting a single user input action and in response thereto changing the position of the objects. Objects remain in the work plane in either the user visible or non-user visible portions. In one embodiment, a smaller than actual representation of the entire work plane is displayed with that portion of the work plane currently in focus by the user.

16 Claims, 8 Drawing Sheets

METHOD AND APPARATUS FOR MOVING AND RETRIEVING OBJECTS IN A GRAPHICAL USER ENVIRONMENT

BACKGROUND

1. Field of the Present Invention

The present invention generally relates to computer systems, and more specifically, to methods and apparatuses that move and retrieve objects in a graphical user environment.

2. Background of Related Art

The advancements for providing the information stored on a computer system to an end user have evolved from DOS based text environments, to window/desktop environments, and ultimately three dimensional (3D) environments. More often than not, the objects occupying the visible display space (i.e. screen real estate) far exceed the particular number of objects required to perform a desired action.

Consequently, the user is often required to move/drag those objects, which are not required to perform the desired action, to a location on the display screen which is remote from the display area that is currently being focused. After the desired action has been completed, the user will typically desire an additional action that requires one or more of the objects that had been previously moved to the remote location, thus, requiring the user to visually locate those remote objects and drag/move them into the display area currently being focused.

In addition, if any of the objects, which were previously being used in the display area, are no longer needed, the user will need to drag those objects to either the same or another remote location on the display screen until they are needed once again.

As can be seen from the above noted description, whenever the user is required to switch their focus of attention from one object or set of objects to another, the efforts required from the user are difficult, tedious, and time prohibitive.

It would, therefore, be a distinct advantage to have a method and apparatus that would use a single user action to put aside an object or set of objects, and a subsequent single user action to bring back the object or set of objects previously put aside without requiring the user to deviate their focus of attention. The present invention provides such a method and apparatus.

SUMMARY OF THE PRESENT INVENTION

The present invention is a method and apparatus for providing a single user action to move an object or set of objects from the display area of a user interface, and provides a subsequent single user action to retrieve the moved object or set of objects to the display area once they are required again.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details.

Figure 1:
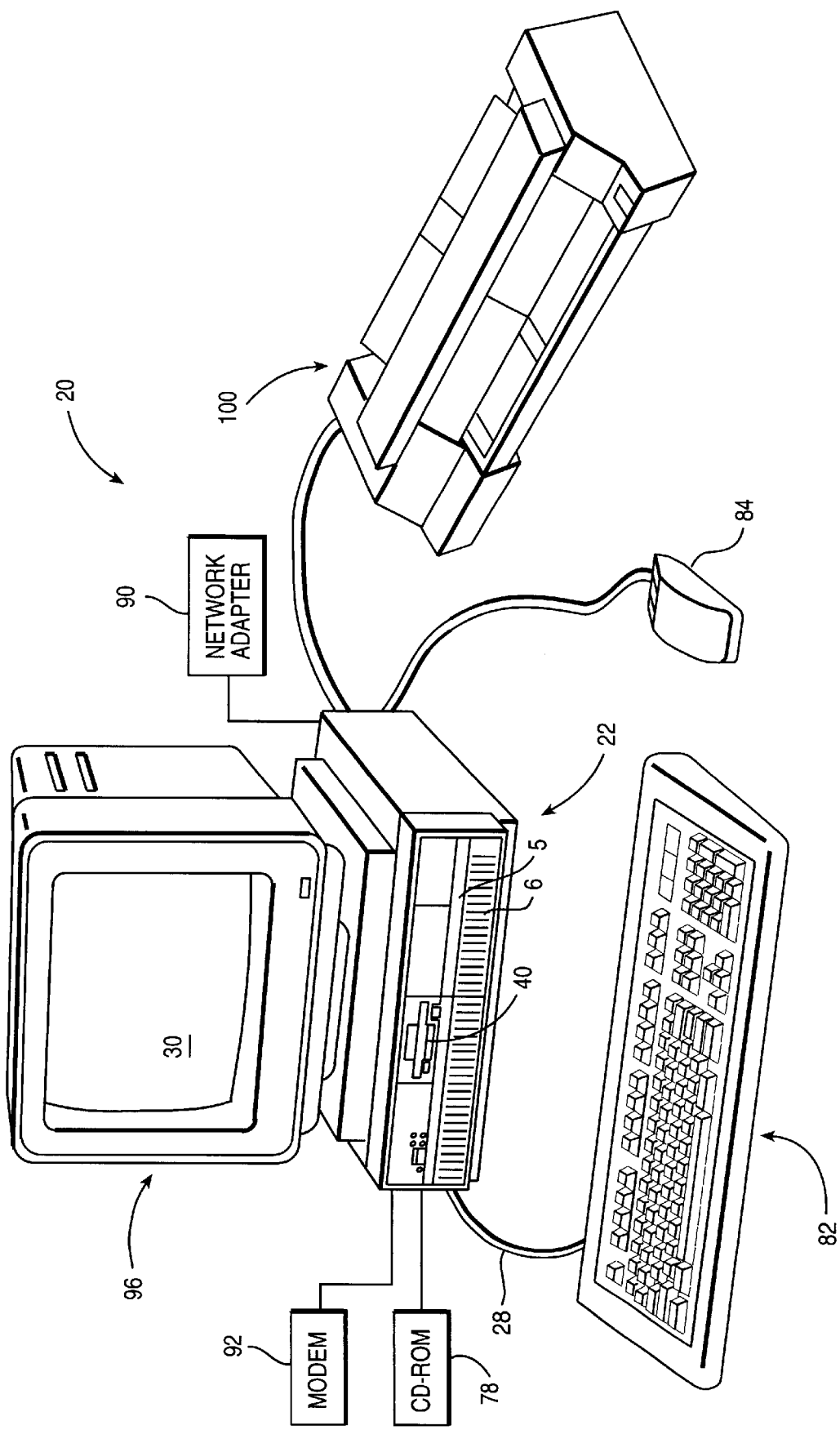
FIG. 1 is a data processing system in which the present invention can be practiced.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
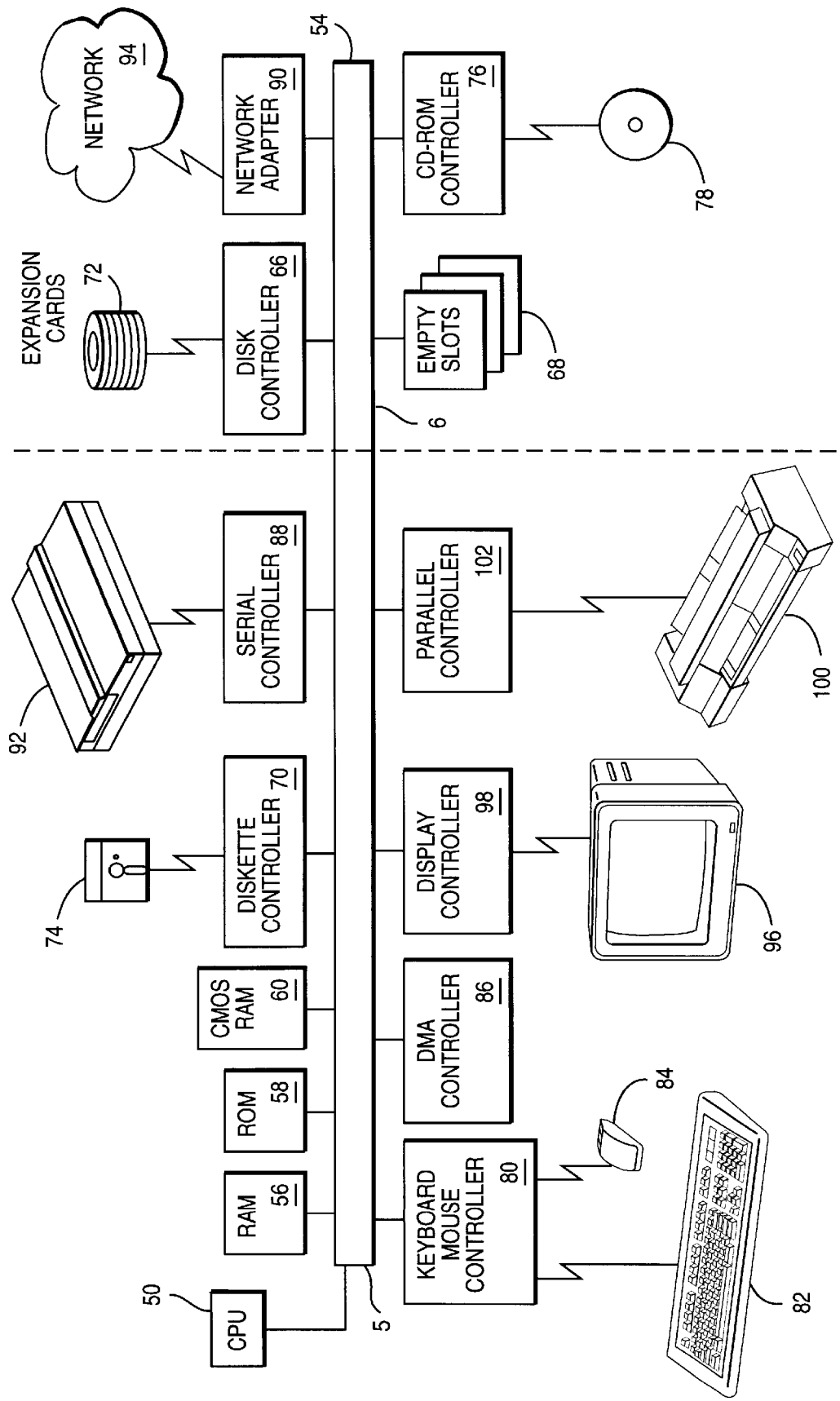
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. the data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lop top palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines, Modem 92 can be utilized to connect data processing system 20 to an on-line information service, or an Internet service Provider provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the Internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

Figure 3:
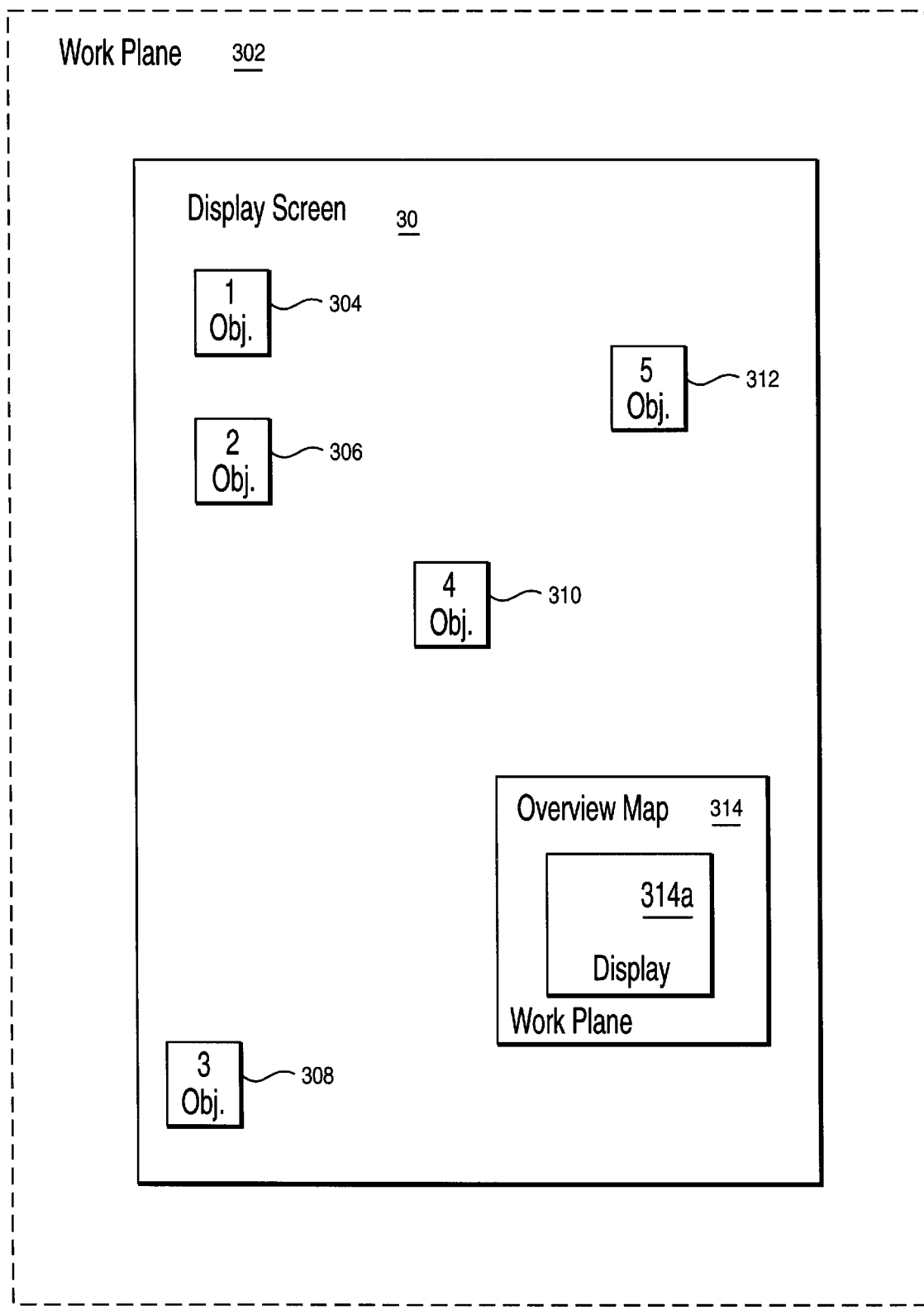
FIG. 3 is a diagram illustrating the display screen of FIG. 1 displaying a work plane (desktop) according to the teachings of the present invention.

Reference now being made to FIG. 3, a diagram is shown illustrating the display screen 30 of FIG. 1 displaying a work plane (desktop) 302 according to the teachings of the present invention. As shown, work plane 302 has a physical dimension which exceeds the physical dimensions of the display screen 30. In addition, an overview map 314 is provided for illustrating a comprehensive view of the work plane 302 within the display screen 30.

The overview map 314 is representative of the physical dimensions of the work plane 302. The overview display 314*a* is representative of the physical dimensions of the display screen 30. The user is able to navigate which portions of the work plane 302 are viewable within the display screen 30 by moving the overview display 314A within the overview map 314 using a cursor, voice command, keyboard, or other means.

Visibly located on the display screen 30 are objects 1–5 304–312. Each of the objects 1–5 304–312 can represent various actions or items within the computer system. For example, object 1 304 could represent a shortcut icon in the MicroSoft Windows 95™ Operating System Environment.

As previously discussed, the user may desire to perform certain actions with designated objects that require most if not all of the available real estate of the display screen. Consequently, the user is required to select any objects which are not currently required to perform the desired action, and remove them from the visible working area within display screen 30.

In the preferred embodiment of the present invention, the user is able to select/designate objects which they desire to move from the viewable area of the display screen 30 to a remote location of the work plane 302. The techniques and methods used for such selection are well known and understood by those of ordinary skill in the art, and therefore, further discussion is deemed unnecessary.

Assume for the moment, that the user desires to perform operations/tasks with objects 1 304 and 5 312. In order to conduct the desired operation with objects 1 304 and 5 312, the user first designates/selects objects 2–4 306–310, and then uses a single action to remove objects 2–4 306–310 to a location of the work plane 302 that is away from the viewable portion of the display screen 30 (i.e. a remote location). In the preferred embodiment of the present invention the single user action is the right click button of the mouse. However, those skilled in the relevant art will readily recognize that any keyboard action (e.g. hot key), voice command, or other single action could alternatively be used for the same purpose.

Figure 4:
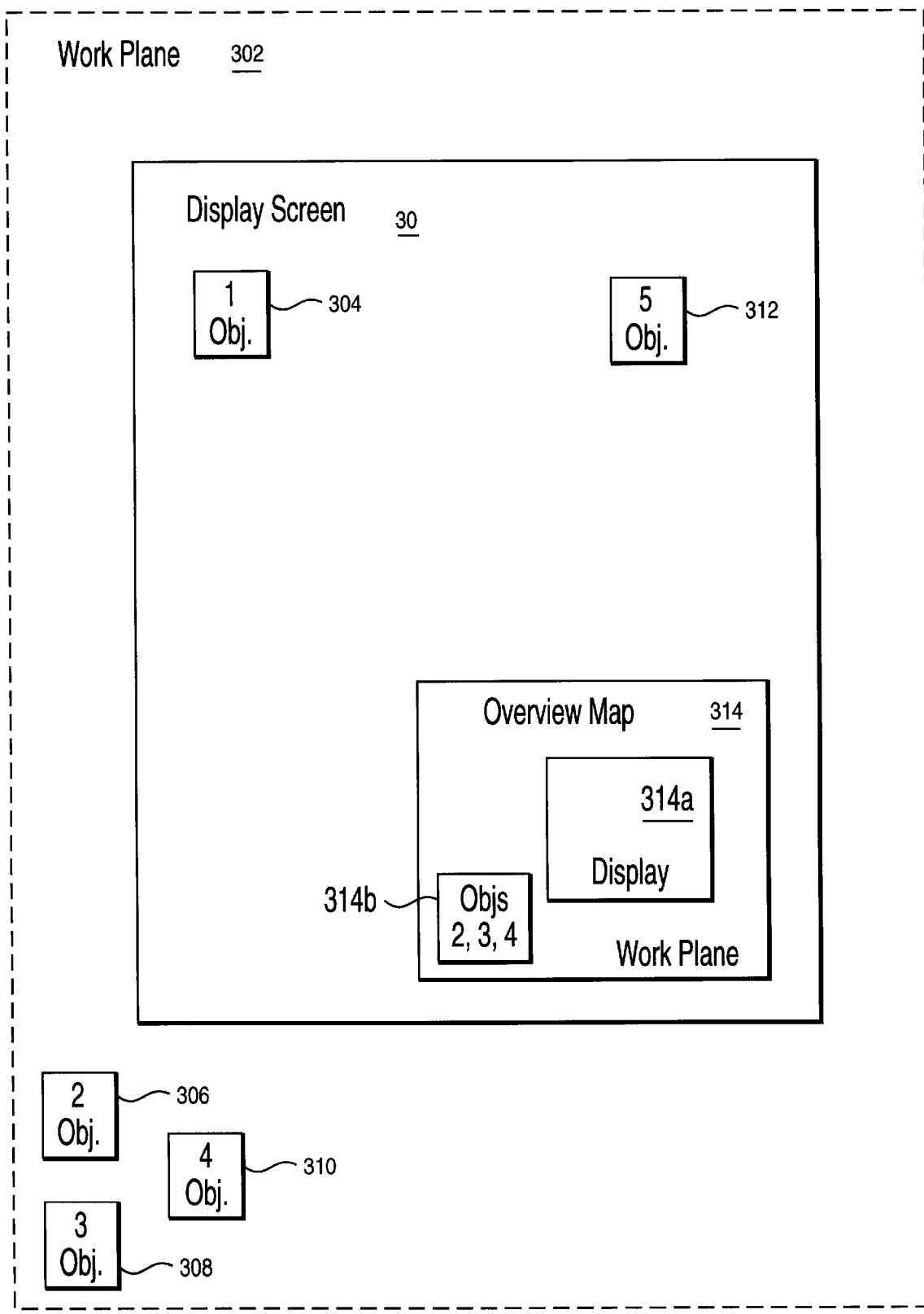
FIG. 4 is a diagram illustrating an example of how the objects of FIG. 3 have been moved from the viewable portion of the display screen according to the teachings of a preferred embodiment of the present invention.

Once the user has designated the objects 2–4 306–310 and initiated the single user action to remove them from the viewable portion of the display screen 30, the objects 2–4 306–310 are removed to a remote location of work plane 302 as illustrated in FIG. 4.

Reference now being made to FIG. 4, a diagram is shown illustrating an example of how objects 2–4 306–310 have been moved from the viewable portion of the display screen 30 of FIG. 3 according to the teachings of the preferred embodiment of the present invention. As shown in FIG. 4, the designated objects 2–4 306–310 have been moved from the viewable portion of the display screen 30 to a remote location of the work plane 302. It should also be noted, that a representation of the moved objects 2–4 306–310 is indicated via a remote representation 314b in the overview map 314. Once the user has performed the desired operations with objects 1 304 and 5 312, user is able to retrieve objects 2–4 306–310 from the remote location on the work plane 302 into a viewable area of the display screen 30 by simply selecting the remote designation 314B, and indicating the retrieval of objects 2–4 306–310.

Figure 5:
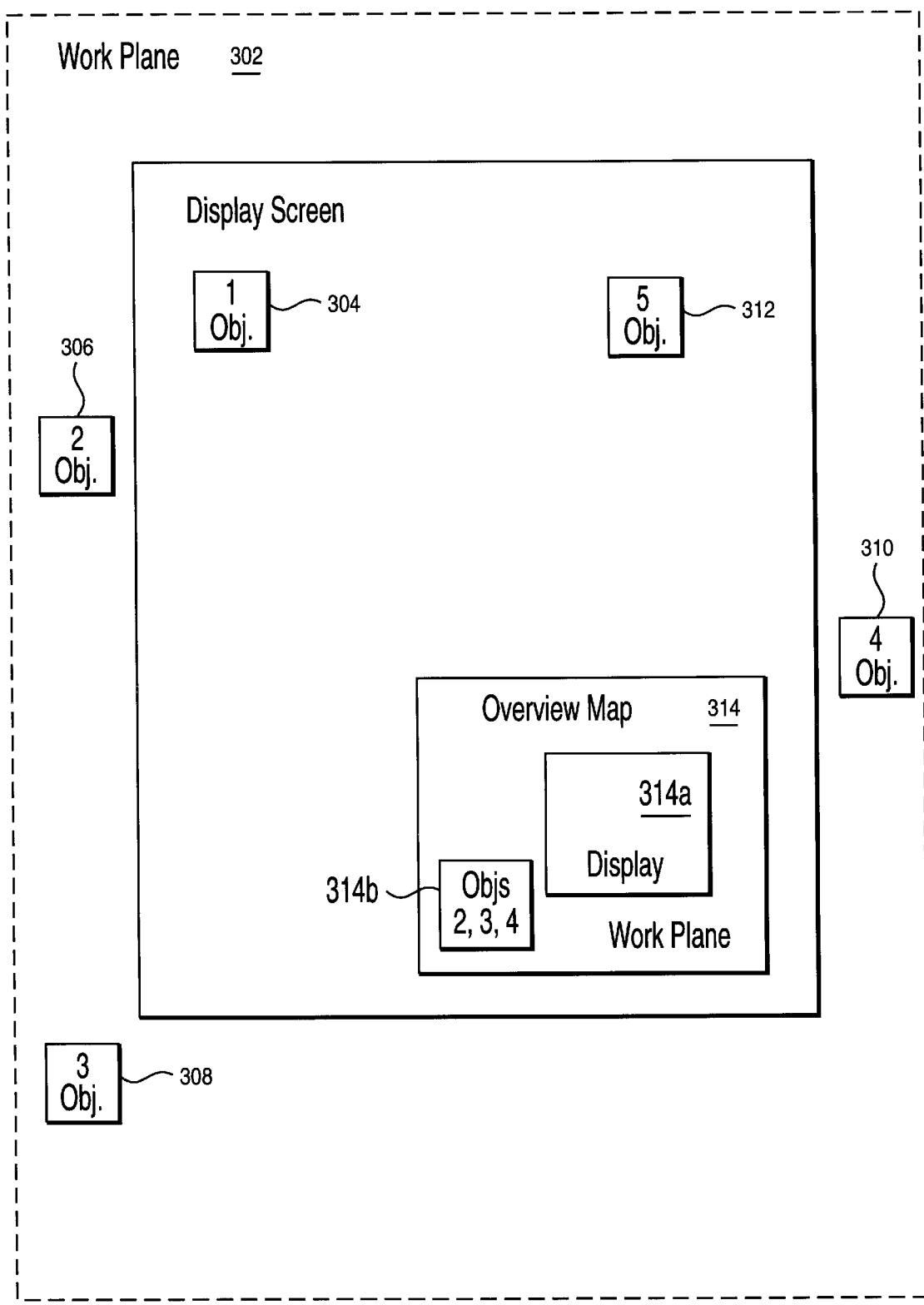
FIG. 5 is a diagram illustrating an alternative movement of the objects of FIG. 3 to remote locations within the work plane according to the preferred embodiment of the present invention.

Although the objects 2–4 306–310 have been designated as a group to be moved from the viewable portion of the display screen 30 to a remote location on work plane 302, the actual placement for each of the objects 2–4 306–310 within the work plane 302 can also be distant one from another as illustrated in FIG. 5.

Figure 6:
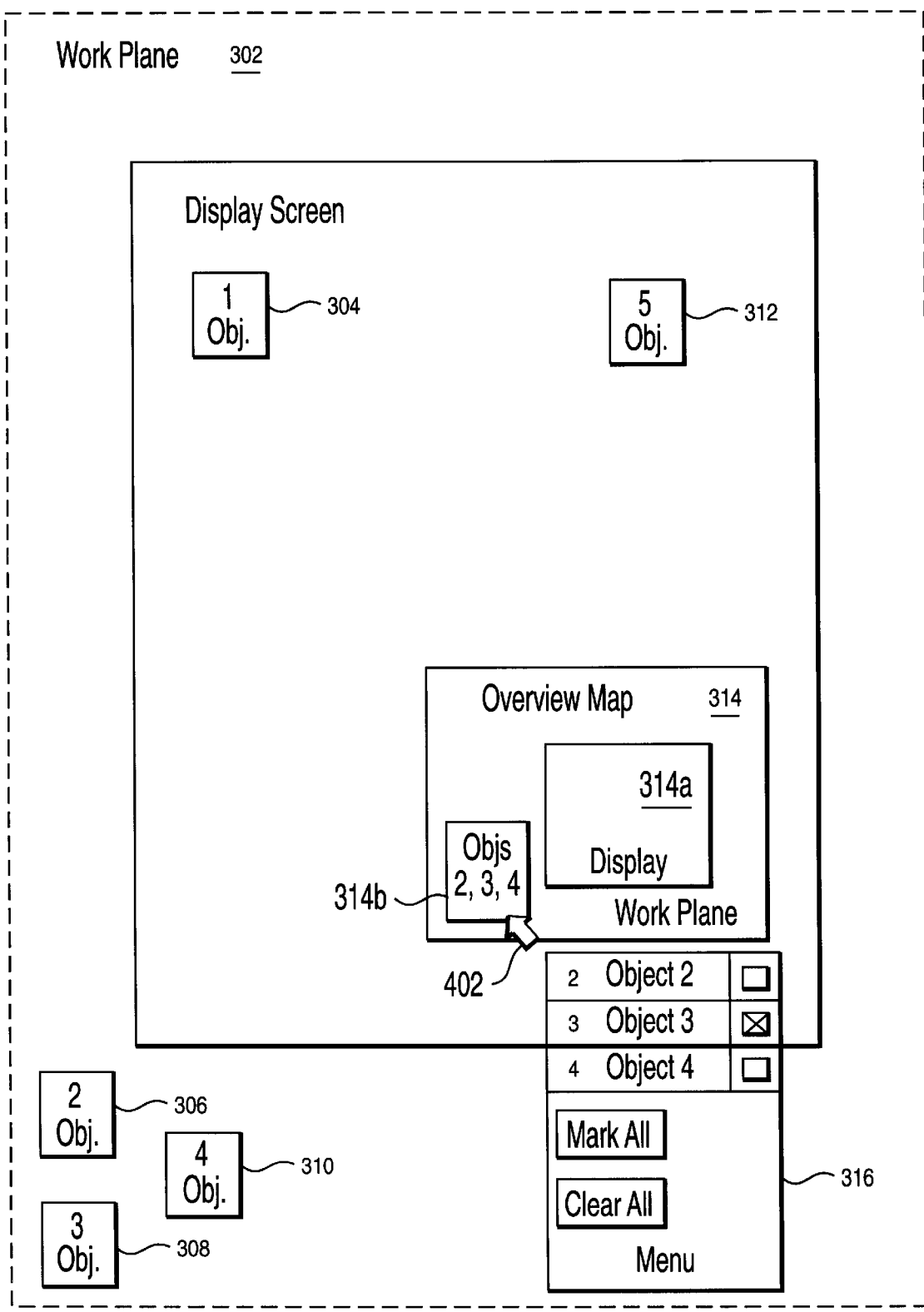
FIG. 6 is a diagram illustrating how the selected objects of FIG. 3 can be retrieved from a non-viewable portion of the work plane according to an alternative embodiment of the present invention.

Reference now being made to FIG. 6, a diagram is shown illustrating how selected objects 2–4 306–310 can be retrieved from a non-viewable portion of the work plane 302 according to an alternative embodiment of the present invention. In this alternative embodiment, when the user desires to retrieve objects 2–4 306–310, and indicates this designation via the selection of the remote designation 314B, in this case the mouse, a selection menu 316 is provided that allows the user to designate one or more of the previously moved objects 2–4 306–310 to be placed back into the viewable portion of the display screen 30.

The particular methods used for such indications of retrieval can be numerous and might be, for example, a listing of the objects with a check box next to each listed object for indicating retrieval, buttons could also be provided for either marking or clearing all such listed objects.

Figure 7:
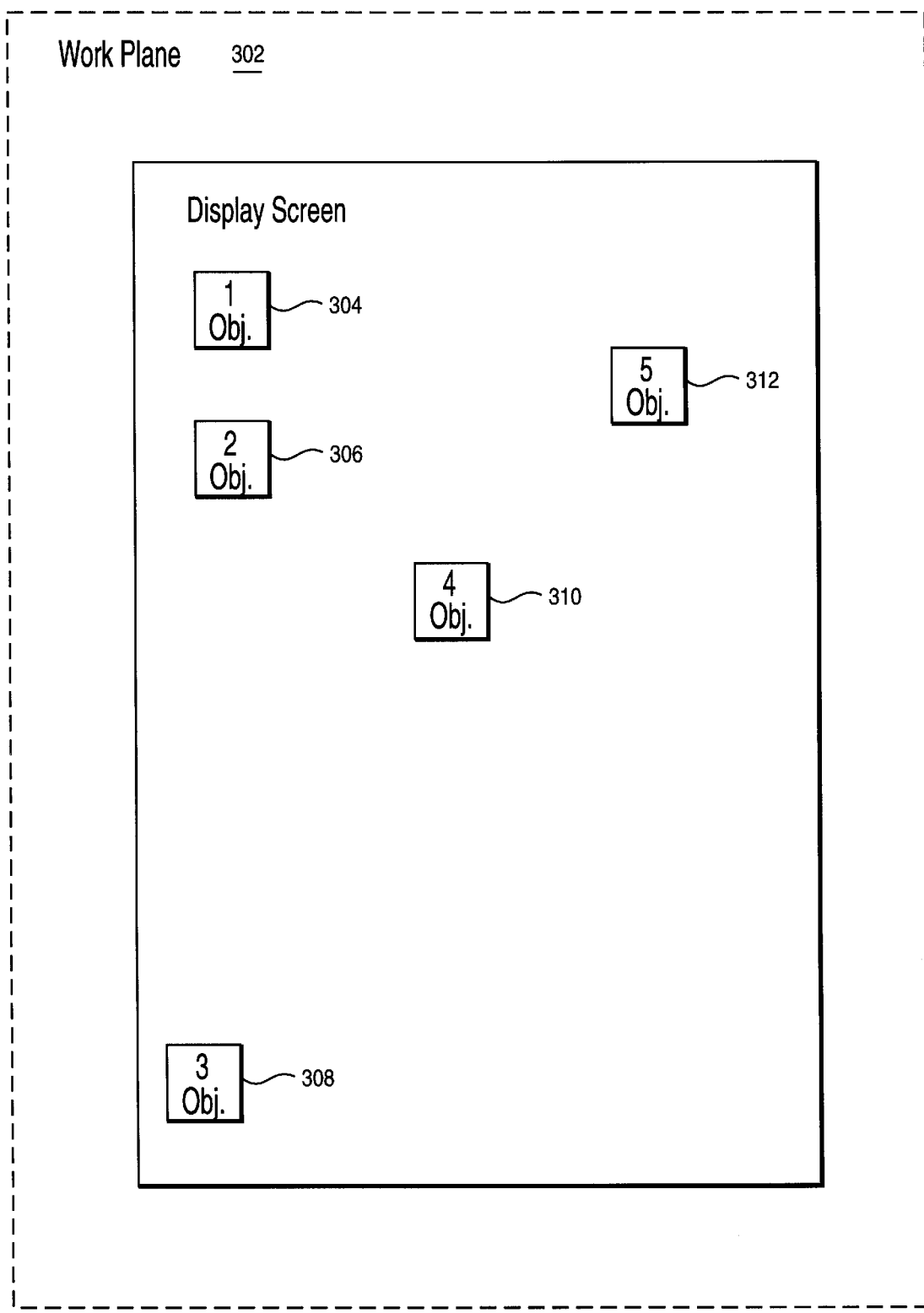
FIG. 7 is a diagram illustrating an alternative embodiment for moving the objects of FIG. 6 from the viewable portion of display screen of FIG. 2 to a remote location within a work plane according to the teachings of an alternative embodiment of the present invention.

Reference now being made to FIG. 7, a diagram is shown illustrating an alternative embodiment for moving objects 2–4 306–310 from the viewable portion of display screen 30 of FIG. 2 to a remote location within a work plane 302 according to another teachings of the alternative embodiment of the present invention. In this alternative embodiment, the user is not provided with the overview map 314 as previously explained in connection with FIGS. 3–6. However, the user is still able to designate/indicate the objects desired to be moved from the viewable portion of the display screen 30 to a remote location on work plane 302 using a single user action as previously described.

For example, the user may desire, once again, to perform certain actions with objects 1 304 and 5 312 that require all or substantially all of the viewable space of the display screen 30. Consequently, the user would select/designate objects 2–4 306–310 for removal from the viewable portion of the display screen 30 to a remote location on the work plane 302. After the selection/ designation, the user would use a single action such as a mouse click, keyboard, or voice command to move the objects 2–4 306–310 to a remote location on work plane 302 as shown in FIG. 8.

Figure 8:
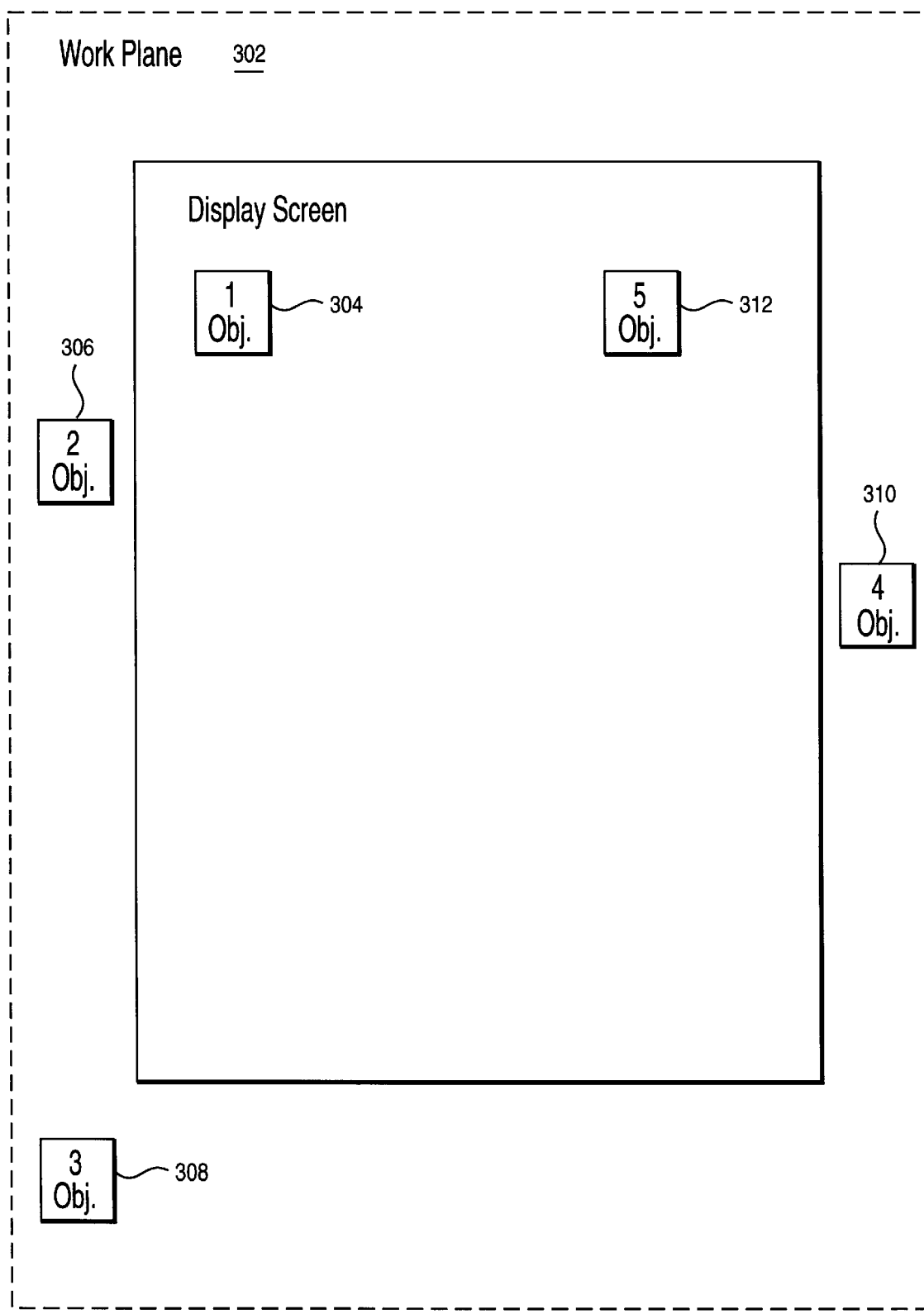
FIG. 8 is a diagram illustrating the movement of the objects of FIG. 2 from the viewable portion of the display screen to a remote location on the work plane according to the teachings of an alternative embodiment of the present invention.

Reference now being made to FIG. 8, a diagram is shown illustrating the movement of objects 2–4, 306–310 from the viewable portion of the display screen 30 to a remote location on the work plane 302 according to the teachings of the alternative embodiment of FIG. 7. As shown, objects 2–4, 306–310 have been moved from the viewable portion of the display screen 30 to distant locations of work plane 302. Those skilled in the relevant art will realize that although the selected objects 2–4 306–310 have been moved to remote locations within work plane 302, they could also be moved as a group to a remote location within the work plane 302.

The retrieval of non-viewable objects 2–4 306–310 can be conducted via the use of a designated hot key, voice command etc., and can optionally include the ability to selectively designate the retrieval of one or more of the objects 2–4 306–310 using a menu selection 316 as previously described in connection with FIG. 6. In this particular embodiment, the selection menu 316 is activated via the use of a designated hot key, voice command, etc., which can be different from or the same as the designation which was previously used to indicate a desire to retrieve objects 2–4 306–310.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. In an interactive computer system including a graphical user interface to an object oriented environment including a work plane larger than a user visible display area:

means for displaying a plurality of objects on said work plane, including within said user visible display area;

means for navigating said work plane;

means for selecting at least one of said plurality of objects;

single action put aside means for moving said at least one object out of said visible display area into another section of said work plane;

single action bring back means for retrieving said at least one object from said another section of said work plane into said visible display area;

means for displaying in said user visible display a less than full size graphic depiction of said work plane;

means for denoting within said depiction a rectangle corresponding to said user visible display are;

means for indicating objects in said depiction; and means for dynamically altering said depiction as objects are moved into and out of said user visible display area.

2. The system of claim 1 wherein said means for indicating includes:

symbol means for representing objects outside said user visible display area rectangle.

3. The system of claim 2 wherein said means for navigating includes:

means responsive to user control for moving said graphic depiction over said work plane; and means for correspondingly altering displayed contents of said user visible display area.

4. The system of claim 3 wherein said single action put aside means comprises:

removal means responsive to a user input indicator.

5. The system of claim 3 wherein said single bring back action means includes:

bring back means responsive to a user input indicator.

6. The system of claim 3 wherein said user indicator is a right mouse click.

7. The system of claim 4 wherein said user indicator is a right mouse click.

8. The system of claim 5 wherein said bring back means additionally includes:

means operable upon user selection of said non visible objects symbol for displaying a pull down menu containing objects represented by said symbol.

9. The system of claim 6 wherein said user input indicator is a hot key.

10. The system of claim 7 wherein said user input indicator is a hot key.

11. In an interactive object oriented computer system, a method for removing from and retrieving to a user visible portion of a work plane one or more objects, comprising the steps of;

selecting at least one object to be moved between said visible portion and a non visible portion of said work plane; and indicating a desired destination for said at least one object by performing a single right clicking action on a pointing device or depression of a single predetermined hotkey, displaying in said user visible portion a less than full size graphic depiction of said work plane;

denoting within said depiction a rectangle corresponding to said user visible portion;

indicating objects in said depiction;

dynamically altering said depiction as objects are moved into and out of said user visible display portion.

12. The method of claim 11 including the additional steps of:

displaying within said user visible portion of said work plane a small overview map graphic representing said work plane;

denoting within said map graphic an area corresponding to said user visible portion;

depicting objects associated with said work plane as within or without said area corresponding to said user visible portion; and dynamically altering said map graphic as said at least one object is moved out of or into said user visible portion.

13. The method of claim 12 including the additional step of:

changing said user visible portion of said work plane when said map graphic is moved.

14. The method of claim 12 wherein said selecting step includes when said at least on object is to be retrieved into said user visible portion:

selecting said at least on object depicted in said map graphic.

15. The method claim 14 wherein said selecting step additionally includes:

displaying a menu of choices when fewer than all of said at least one object are to be retrieved into said user visible portion of said work plane.

16. A computer program product for use in an interactive computer system including a graphical user interface to an object oriented environment with a work plane larger than a user visible display area, comprising:

means for displaying a plurality of objects on said work plane, including within said user visible display area;

means for navigating said work plane;

means for selecting at least one of said plurality of objects;

single action put aside means for moving said at least one object out of said visible display area into another section of said work plane;

action bring back means for retrieving said at least one object from said another section of said work plane into said visible display area;

means for displaying in said user visible display a less than full size graphic depiction of said work plane;

means for denoting within said depiction a rectangle corresponding to said user visible display are;

means for indicating objects in said depiction; and means for dynamically altering said depiction as objects are moved into and out of said user visible display area.

* * * * *